Dec. 13, 1927.
A. L. KERN
1,652,785
AUTOMOBILE BUMPER
Filed Aug. 5, 1926
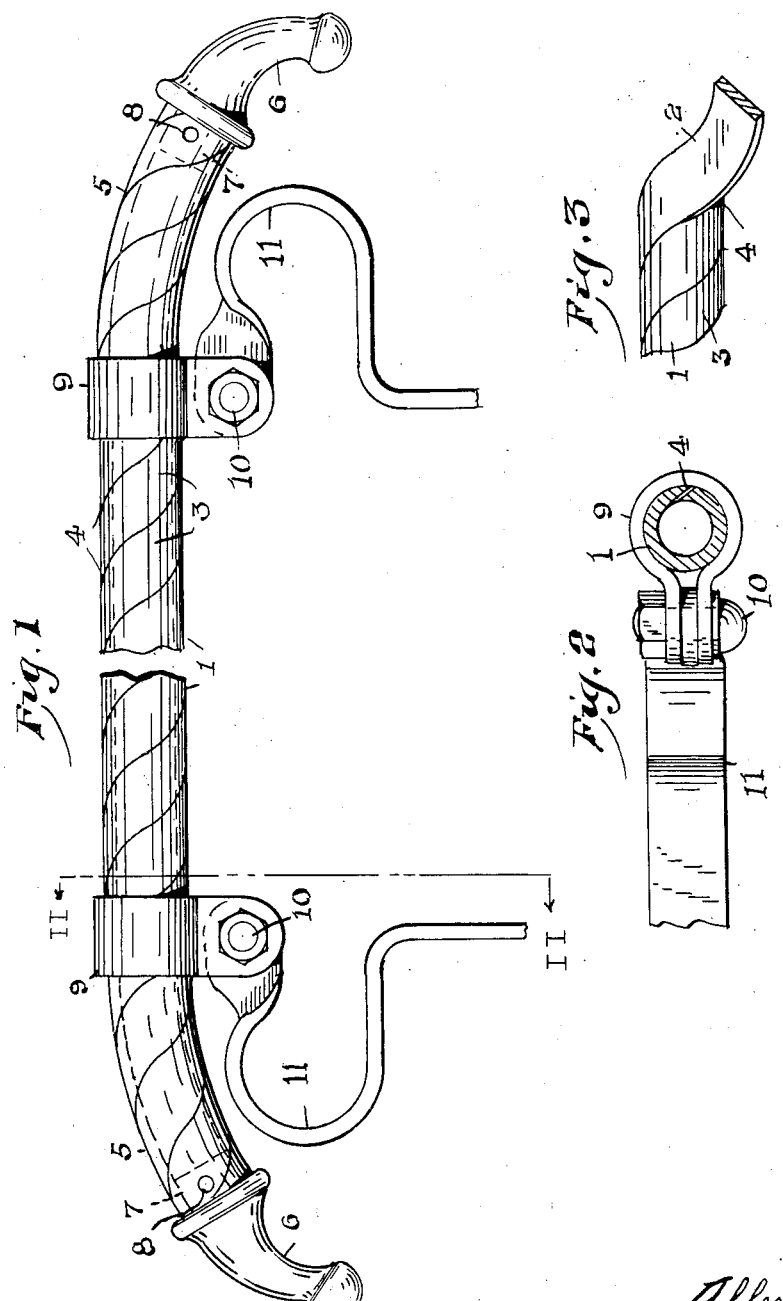
INVENTOR.
Albert L. Kern
BY
ATTORNEY Patented Dec. 13, 1927.

1,652,785

UNITED STATES PATENT OFFICE.

ALBERT L. KERN, OF AURORA, ILLINOIS.

AUTOMOBILE BUMPER.

Application filed August 5, 1926. Serial No. 127,215.

My invention relates to an automobile bumper and important objects thereof are to provide a bumper of the character described, in a manner as hereinafter referred to, which is resilient; which will withstand sudden shocks without deformation, distortion or rupture; which is simple in its construction and arrangement, flexible, strong, durable and efficient in its use, attractive in appearance, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a top plan view of an automobile bumper constructed in accordance with the invention.

Figure 2 is a sectional view on line II—II, Figure 1.

Figure 3 is a fragmentary view of the bumper partially expanded.

Referring in detail to the drawing 1 denotes the bumper bar comprising a cylindrical, elongated body portion constructed from a comparatively narrow continuous flatstrip 2 of resilient spring metal of strap like form. The strip 2 is of uniform thickness from end to end and has each of its faces and edges uninterrupted from end to end. The strip 2 is rectangular in transverse cross section, that is to say in the form of a right angled parallelogram and said strip 2 throughout is coiled helically or spirally to form a tubular structure of conventional automobile bumper length. The convolutions or coils 3 forming the body portion 1, are regular in size and preferably arranged so that the interstices 4 therebetween are reduced to a minimum.

It will, of course, be noted that the degree of resiliency and rigidity of the body portion 1 may be provided to best meet conditions found in practice, by variations in the factors involving the diameter of the body portion 1, the relative proximity of the coils 3 with respect to each other, the spiral length of the coils, and the width, thickness and inherent properties of the metal strip 2 employed in the formation of the body portion 1.

The body portion 1 is formed with rearwardly curved end portions 5 provided with suitable ornamental terminal heads 6. Each of the heads 6 is integrally formed, at its inner end, with a neck 7 which extends into respective ends of the body portion 1. Rivets 8, extending through the body portion 1 and through the necks 7, serve to fixedly secure the heads 6 to the body portion 1.

The body portion 1 is carried by a pair of properly spaced clips 9 which are connected, as at 10, to respective resilient supporting brackets 11. The latter may be attached to the associated motor vehicle in any suitable manner.

While illustrating and describing an automobile bumper device adapted to extend across the width of the motor vehicle, it is to be understood the principle of my improved construction may readily be embodied in the manufacture of the bumperette type of bumper, as commonly employed for protecting the rear end of motor vehicles.

An automobile bumper constructed in accordance with my invention will withstand the most severe collision shocks, to the point of rupture without distortion and its resiliency will effect the instantaneous return of all portions thereof to the normally aligned position.

What I claim is:

1. In an automobile bumper, a bumper bar comprising solely an elongated tubular body portion constructed from a continuous length of spirally coiled resilient strip metal, said strip metal being in the form of a right angled parallelogram in transverse cross section.

2. In an automobile bumper, a bumper bar comprising solely a body portion constructed from a continuous length of resilient strip metal of uniform thickness from end to end and formed throughout to provide a continuous length of spirally arranged coils, said coils being regular and the interstices therebetween being reduced to a minimum.

3. In an automobile bumper, a bumper bar comprising solely a body portion constructed from a continuous length of resilient strip metal being in the form of a right angled parallelogram in transverse cross section and formed throughout to provide a continuous length of spirally arranged coils, said coils being regular and the interstices therebetween being reduced to a minimum.

4. In an automobile bumper, a bumper bar comprising solely a body portion constructed from a continuous length of resilient strip metal being in the form of a right angled parallelogram at any point throughout its length in transverse cross section and formed throughout to provide a continuous length of spirally arranged coils, said coils being regular and the interstices therebetween being reduced to a minimum, said body portion having the end portions thereof curved rearwardly.

5. In combination, an automobile bumper comprising solely an elongated, hollow cylindrical body portion constructed from a continuous length of resilient strip metal in the form of a right angled parallelogram in transverse cross section at any point throughout its length and formed throughout to provide a continuous length of closely arranged, spirally extending, regular coils, said body portion having its end terminal portions curved rearwardly, a terminal head fixed in and extending from each end of said body portion, and resilient elements connected with said body portion and being adapted to be attached to an automobile.

6. In an automobile bumper, a bumper bar comprising an elongated tubular body portion formed from a continuous length of a spirally coiled resilient metallic strip, said strip in transverse cross section being of uniform thickness throughout and further having both of its faces free of interruptions from end to end in transverse cross section at any point throughout.

7. In an automobile bumper, a bumper bar comprising a tubular body portion of appropriate length and formed from a single strip of resilient metallic material spirally coiled from end to end and of uniform thickness in transverse cross section, at any point throughout the length thereof, said coils being uniform throughout and with the interstices between the edges of the coils being reduced to a minimum.

8. In an automobile bumper, a bumper bar comprising a tubular body portion of appropriate length and formed from a single strip of resilient metallic material spirally coiled from end to end and of uniform thickness in transverse cross section, at any point throughout the length thereof.

9. In an automobile bumper, a bumper bar comprising a tubular body portion of appropriate length formed of a spirally coiled single strip of resilient metallic material of strap like form, said strip in transverse section being in the form of a right angled parallelogram at any point throughout.

10. In an automobile bumper, a bumper bar comprising a tubular body portion of appropriate length formed of a spirally coiled single strip of resilient metallic material of strap like form, said strip in transverse section being in the form of a right angled parallelogram at any point throughout, said coils being uniform throughout and having the interstices between the edges thereof reduced to a minimum.

11. In an automobile bumper, a bumper bar comprising a tubular body portion of appropriate length formed of a spirally coiled single strip of resilient metallic material of strap like form, said strip in transverse section being in the form of a right angled parallelogram at any point throughout, said coils being uniform throughout and having the interstices between the edges thereof reduced to a minimum, said body portion having rearwardly extending end terminal portion and the interior thereof from one end terminal portion to the other being free of interruption.

12. A bumper rod for automobiles consisting solely of a tubular body portion of appropriate length formed of a spirally coiled single strip of metallic material of strap like form, said strip coiled from end to end, the coils being uniform throughout and with the interstices between the edges of the coils being reduced to a minimum.

In testimony whereof I affix my signature.

ALBERT L. KERN.